United States Patent [19]

Huggler

[11] 4,216,372

[45] Aug. 5, 1980

[54] TOASTER CHASSIS ASSEMBLY

[75] Inventor: Peter E. Huggler, Columbia, Mo.

[73] Assignee: McGraw-Edison Company, Elgin, Ill.

[21] Appl. No.: 15,195

[22] Filed: Feb. 26, 1979

[51] Int. Cl.² .......................... H05B 3/06; A47J 37/08
[52] U.S. Cl. ........................................ 219/521; 99/389;
        99/401; 219/536; 219/537; 219/542
[58] Field of Search ............... 219/385, 386, 521, 524,
        219/525, 532, 536, 537, 542; 99/329, 385–389,
                391, 400, 401; 248/27, 309, 361; 174/52

[56] References Cited

U.S. PATENT DOCUMENTS

| | | | |
|---|---|---|---|
| 2,522,724 | 9/1950 | Scharf | 219/542 |
| 2,545,404 | 3/1951 | Young | 219/521 X |
| 2,747,072 | 5/1956 | Lawser | 219/521 |
| 2,778,912 | 1/1957 | Palmer et al. | 219/521 |
| 2,831,096 | 4/1958 | Signore, Jr. | 219/521 X |
| 3,363,089 | 1/1968 | Snyder | 219/537 |
| 3,529,537 | 9/1970 | Snyder | 99/389 |
| 3,529,538 | 9/1970 | Ottinger | 99/389 |
| 3,530,279 | 9/1970 | Ottinger | 219/542 |

Primary Examiner—Volodymyr Y. Mayewsky

Attorney, Agent, or Firm—Ronald J. LaPorte; Jon C. Gealow; Bruce R. Mansfield

[57] ABSTRACT

A toaster chassis assembly for supporting heating element cards in an upstanding position in parallel relation, to define a bread-receiving slot therebetween, includes a horizontal base and end walls extending vertically upwardly from opposite ends of the base. The base defines a plurality of spaced slots for receiving tabs formed along the lower edges of the heating element cards for mounting the cards between the end walls and a plurality of tabular hooks extending from the base. Wire bread guards each comprising a plurality of vertical elements and an upper and lower horizontal element to form a grid, are mounted adjacent to the heating element cards to prevent engagement of bread slices being toasted with the heating element cards. The lower horizontal elements of the wire bread guards are received in the tabular hooks and the upper horizontal elements are received in slots formed along the upper edges of the end walls for supporting the bread guards. The upper horizontal elements of the wire bread guards are offset for engagement with tabs formed along the upper edges of the heating element cards, on opposite sides thereof, to provide support thereto along the upper ends thereof.

10 Claims, 4 Drawing Figures

TOASTER CHASSIS ASSEMBLY

BACKGROUND OF THE INVENTION

This invention relates generally to electric toasters and more particularly to an improved toaster chassis assembly therefor.

Electric pop-up toasters conventionally employ sheet metal frames and the like structures for supporting wire bread guards and heating element cards. In many cases relatively heavy metal pieces extend across the top of the toaster frame structure to provide support to the last mentioned components. The use of the metal pieces, along with a relatively heavy support frame structure, increases the cost of such toasters and can make their assembly more time-consuming.

Examples of toasters of the last-described type are shown in U.S. Pat. Nos. 3,529,537; 3,529,538; 2,778,912; 2,725,816; and 2,522,724.

SUMMARY OF THE INVENTION

Accordingly, it is a primary object of the present invention to provide a new and improved toaster chassis assembly which overcomes the drawbacks of prior art toaster chassis assemblies and uses a minimum of sheet metal to support the wire bread guards and heating element cards employed therein, yet is easily assembled and is relatively lower in cost.

It is another object of the present invention to provide a toaster chassis assembly of the last mentioned type which gives adequate support to the bread toasting elements with a minimum number of components.

Briefly, preferred embodiment of a toaster chassis assembly according to the invention comprises a horizontal base and vertical, upstanding end walls extending from opposite ends of the base, formed preferably of a single sheet of metal bent into a U-shape.

Heating element cards are supported vertically along the base between the end walls, spaced from each other to define bread slice-receiving slots. A conventional toaster carriage for lowering and raising bread slices into the spaces between the heating element cards is mounted on the toaster chassis assembly.

Slotted apertures are defined along the base on opposite sides of the bread slice-receiving slots for receiving tabs formed on the lower ends of the heating element cards. Spaced tabular hooks extend upwardly from the base and slots are defined in the free edges of the upstanding vertical end walls of the frame. The hooks and slots are provided to receive lower and upper, respectively, horizontally extending wire elements of wire bread guards, included as a part of the toaster chassis assembly according to the invention, for supporting the latter in a vertical orientation. The bread guards serve to maintain the bread slices out of engagement with the heating element cards. The upper horizontal wire elements of the bread guards are offset for engagement of tabs formed along the upper edges of the heating element cards. All of the components described are snap-fitted together, requiring no external fasteners. No upper sheet metal cross members are required as the wire bread guards and slotted base section provide adequate support to the heating element cards.

DETAILED DESCRIPTION OF THE DRAWINGS

Figure 1:
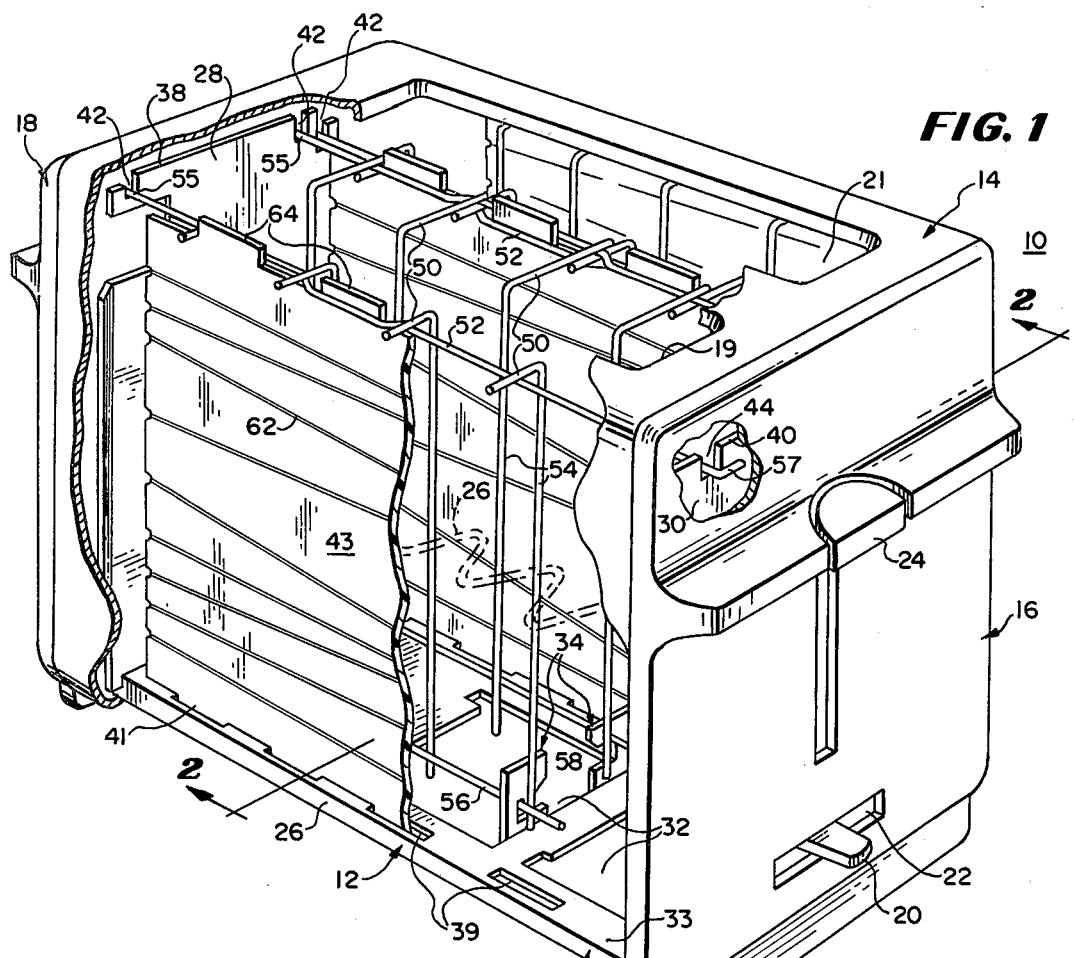
FIG. 1 is a partially broken away, perspective view of an electric pop-up toaster, including a chassis according to the invention.

Referring now to the drawings in greater detail wherein like numerals have been employed throughout the various views to designate similar components, a two-slice, electric, pop-up toaster 10 including a chassis assembly 12 according to the invention, is illustrated as FIG. 1. The toaster 10 includes an outer, one-piece, U-shaped, chrome cover 14 and decorative end panels 16, 18, attached thereto forming an outer housing for the toaster. The horizontal wall of the chrome cover defines a pair of bread slice receiving slots 19, 21. A color control lever arm 20 extends through a slotted aperture 22 in end panel 16 of the toaster. A depressible knob 24 attached to a lever arm (not shown) for operating a bread carriage on which the bread slices are lowered into and raised from the toaster interior, is also provided on end panel 16 for manual operation thereof. A carriage latch and release mechanism (not shown) is mounted between the toaster chassis assembly and the end panel 16 for controlling the operation of the bread carriage. The latch and release mechanism can itself be controlled by a bi-metal element (not shown) of a conventional design. An electrical switch mechanism (not shown) for operating the heating elements (to be described) of the toaster is mounted at the opposite end thereof between end panel 18 and the toaster chassis assembly 12.

The last-mentioned toaster latch and release mechanism, and electrical switch mechanism, as well as the end panels and chrome decorative cover, comprise no part of the subject invention, but have been discussed herein merely to complete the description of the electric toaster in which the toaster chassis assembly according to the invention is employed.

The toaster chassis assembly 12 according to the invention includes a U-shaped member 24 having a horizontal base 26 and vertical, upstanding end walls, 28, 30, attached at the lower ends to opposite ends of the base. In a preferred embodiment of the chassis assembly 12, the member 24 is formed of a single sheet of metal, bent in the shape of a U.

The base section 26 has a plurality of cut-outs, such as 32, formed therein to permit crumbs falling down from toasted bread slices in the toaster, to drop through the base 26 into a crumb tray (not shown) positioned therebeneath.

Formed integrally with the base and bent vertically upwardly therefrom are tabular hooks, such as 34, 36. Four pairs of hooks are provided in a preferred embodiment of the two-slice toaster chassis assembly shown in the drawings. The purpose of the hooks will be described hereinafter.

In the two-slice toaster shown, base 26 defines three spaced horizontally extending plate portions 33, 35, 37, respectively, (FIG. 2) extending the length thereof between end walls 28, 30. The plate portions are aligned with opposite edges of the bread-receiving slots, 19, 21, formed in the toaster cover and each plate portion defines a series of elongated slots, such as 39, for receipt of tab portions 41 formed on heating element cards 43 along the lower edges thereof, to be discussed in greater detail hereinafter.

Figure 2:
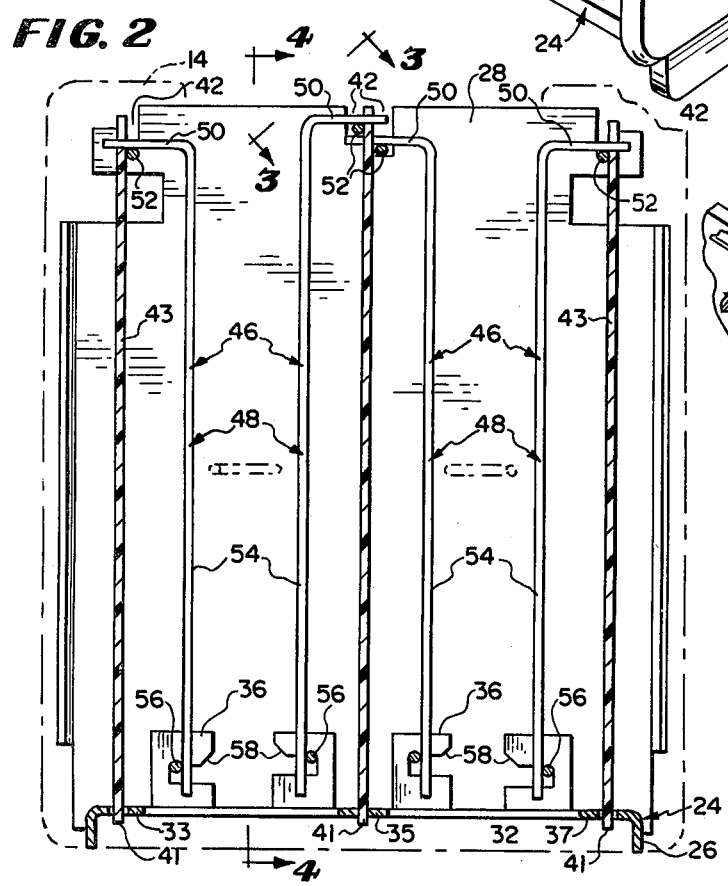
FIG. 2 is a sectional view of FIG. 1 taken along line 2—2 thereof.
Figure 3:
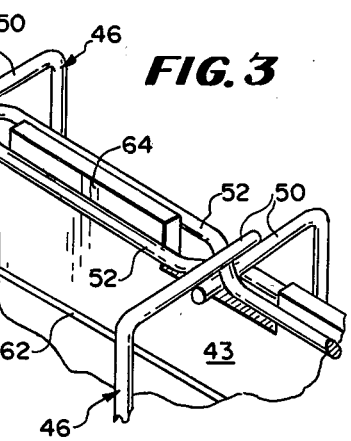
FIG. 3 is a sectional view of the toaster of FIG. 1 taken along the line 3—3 thereof.

End walls 28, 30 of the toaster chassis assembly 12 each include, along the upper edges 38, 40, respectively, thereof, slots 42, 44. The slots open upwardly as shown in FIGS. 1 and 2 of the drawings and are aligned generally with the plate portions of the base section.

Figure 4:
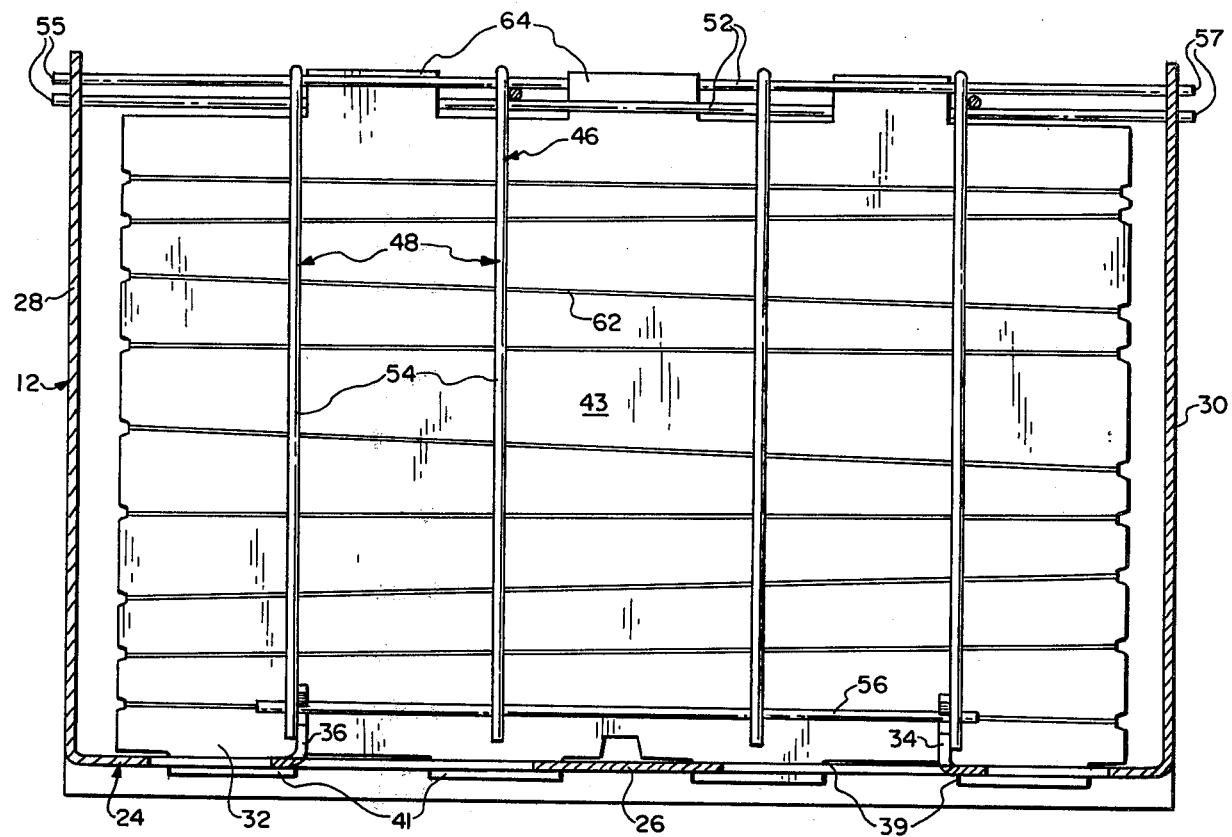
FIG. 4 is a sectional view of the toaster of FIG. 1 taken along the line of 4—4 thereof.

In addition to the frame member 24, the toaster chassis assembly 12 includes wire bread guards, such as 46. Each of the bread guards is similar structurally, taking the form of a grid or grille. Each bread guard includes a plurality of vertically extending L-shaped wire elements 48, joined at the shorter legs 50 in spaced relation, by a first upper, horizontally extending wire element 52 and at the longer legs 54, by a second, lower, horizontally extending wire element 56. The lower wire element 56 is received in the tabular hook pairs 34, 36 (FIG. 4). As mentioned heretofore, four pairs of hooks are provided to accommodate four-wire bread guards 46 in the two-slice toaster illustrated. The hooks of each pair are located adjacent a corresponding plate portion in alignment therewith and in spaced relation with respect to each other. In the case of a four-slice toaster, additional pairs of hooks are required as are additional wire bread guards. The hooks support and in turn align the bread guards along opposite sides of the bread receiving slots 19,21.

The ends 55, 57 of the upper horizontal wire elements 52 of the bread guards are received in corresponding slots such as 42, 44 formed along the free ends of end walls 28, 30, respectively, as shown in FIG. 1. Ends 55, 57 of the bread guards are bent at right angles to the wire element 52 to prevent longitudinal movement of the bread guards. The spacing between the upper and lower horizontal wire elements 52, 56 of the bread guards is slightly less than the distance between hook pairs 34, 36 and slots 42, 44, respectively, making it necessary to snap the wire bread guards into position therebetween for support thereby. To provide ease in assembly of the bread guards, cam surfaces 58 formed integrally with the tabular hooks, enable the lower horizontal wire elements 56 of the bread guards, to be guided into the hooks after the upper horizontal wire elements 52 are received in slots 42, 44, respectively.

The heating element cards 43 are mounted, between end walls 28, 30 with the plane of the cards substantially perpendicular thereto. The cards are supported at opposite upper and lower ends by the base 26 and wire bread guards 46, respectively, of the toaster chassis assembly 12. The heating element cards, which are fabricated of mica or other similar insulative material, are wrapped in a conventional manner with heating element wire 62, such as Nichrome or the like. As mentioned heretofore, the heating element cards 43 are provided with integrally formed tabs 41 and 64, along the bottom and top edges, thereof, respectively.

Lower tabs 41 are received in elongated slots 39 provided in plate portions 33, 35, 37 of base 26 of the chassis assembly, while upper tabs 64 are secured by upper horizontal wire elements 52 of the upstanding bread guards 46. The upper wire elements 52 are offset to engage upper tabs 64 on opposite sides of the card, thereby to prevent sidewise movement of the heating element cards at their upper end. The bread guards extend parallel to, but are spaced from the heating element cards as illustrated in the drawings.

In the two-sliced toaster illustrated in the drawings, three heating element cards are provided, the center heating element card serving to toast bread slices in both bread receiving slots 19, 21. The two outermost cards are each supported along the top by a single wire bread guard, while two wire bread guards positioned adjacent to each other between the bread receiving slots 19, 21, support the center heating element card. The upper horizontal wire elements 52 of the bread guard supporting the center heating element card being offset as described, overlap or interweave to form spaced therebetween for receiving upper tabs 64 of the heating element card. While one bread guard is sufficient to maintain a heating element card in an upright position, the two bread guards on opposite sides of the center heating element card are used to prevent bread slices fed into slots 19 and 21 from engaging the heating element wire 62 supported by the card.

As can be seen from the description of the toaster chassis assembly according to the invention, the assembly is relatively simple in construction, using a minimum number of components, yet provides adequate support for heating element cards employed in a "pop-up" electric toaster. Each of the components described can be joined to a cooperating component without separate fasteners, making the toaster chassis assembly easy to assemble. The toaster is likewise easy to service in the event a heating card element requires replacement. Furthermore, because of a minimum of sheet metal is used in the toaster chassis assembly, the toaster is lightweight.

While a particular embodiment of the invention has been shown and described, it should be understood that the invention is not limited thereto since many modifications may be made. It is therefore contemplated to cover by the present application any and all such modifications in face within the true spirit and scope of the appended claims.

I claim:

1. An electric toaster chassis assembly for supporting at least two heating card elements in a vertical position, spaced from each other in generally parallel relation to define a bread-receiving slot therebetween, each said heating element card having spaced tabs along the upper and lower edges thereof, respectively, said toaster chassis assembly including a combination: a horizontal base; first and second end walls, each joined at a first end thereof to an end of said base, and extending vertically upwardly therefrom; said base including a plurality of spaced slots for receiving the lower tabs of said heating element cards to position said cards with the plane thereof extending, perpendicular to said end walls, and securing means predeterminedly spaced from said tab receiving slots; at least two bread guard means, each including a plurality of elements joined together in spaced relation to form a grill member, said bread guard means each including upper and lower elements, said lower elements being engagable by said securing means for positioning each said bread guard means between said end walls in spaced relation with respect to said heating element cards thereby permitting a bread slice to be received between said bread guards means, said second, free ends of said end walls of said toaster chassis assembly each including means for engaging said upper elements of said bread guard means, said securing means and upper engaging means retaining said bread guard means in an upstanding position, said upper elements of said bread guard means being offset for engaging said upper tabs on opposite sides of said heating element cards, thereby to support the latter at the upper ends thereof.

2. An electric toaster chassis assembly as claimed in claim 1 wherein said securing means include tabular hooks extending upwardly from said base and receiving said lower elements of said bread guard means.

3. An electric toaster chassis assembly 2 wherein said base and end walls are integrally formed in the shape of a U.

4. An electric toaster chassis assembly as claimed in claim 1 wherein said means for engaging said upper elements of said bread guard means include the free ends of said end walls which define slotted openings therein for receiving said upper elements of said bread guard means, whereby said bread guard means is supported thereby and retained in an upright position.

5. An electric toaster chassis assembly as claimed in claim 2 wherein said tabular hooks each include a cam surface and wherein the distance between said hooks and said slotted free ends of said end walls is predeterminedly greater than the distance between the upper and lower elements of said bread guard means, whereby said lower elements of said bread guard means are guided into engagement with said tabular hooks.

6. An electric toaster chassis assembly as claimed in claim 4 wherein each said bread guard means includes a plurality of generally vertically disposed wire elements joined along the upper ends thereof by a generally horizontally disposed upper wire element and at the lower ends thereof by a generally horizontally disposed lower wire element, wherein said lower and upper horizontal wire elements are received in predetermined ones of said tabular hooks and predetermined ones of said slots defined in free ends of said end walls, respectively, for positioning each said bread guard means in an upstanding position adjacent and parallel to the plane of a corresponding heating element card.

7. An electric toaster chassis assembly as claimed in claim 6 wherein said vertical elements of said bread guard means are each L-shaped and wherein said upper horizontal element is joined to said vertical elements along the shorter leg of said L.

8. An electric toaster chassis assembly for supporting at least two heating element cards in a vertical position, spaced from each other in generally parallel relation to define a bread receiving slot therebetween, each said heating element card having spaced tabs along the upper and lower ends thereof, respectively, said toaster chassis assembly including in combination:
a horizontal base; a pair of vertically upstanding end walls joined at first ends to opposite ends of said base; said base defining a plurality of spaced slots, predeterminedly located for receiving the lower tabs of said heating element cards to position said cards with the plane thereof extending substantially perpendicular to the plane of said end walls and a plurality of hooks means spaced from said slots and extending upwardly from said base; and at least two grill-like bread guards, each including a plurality of vertical elements and an upper and lower horizontal element joined to said vertical elements in space relation with respect to each other, said lower horizontal elements being receivable in predetermined ones of said hook means for securing the lower ends of said bread guards in spaced relation from corresponding ones of said heating element cards, said two bread guards being spaced from each other sufficiently to permit a bread slice to be received therebetween, said upper, free ends of said end walls defining openings for receiving the upper elements of said bread guards, whereby said bread guards are secured in a vertical upstanding position, the upper horizontal elements of said bread guards being predeterminedly offset along the length thereof for engaging the upper tabs of said heating element cards on opposite sides thereof, thereby to support said heating element cards at the upper ends thereof.

9. A toaster chassis assembly as claimed in claim 8 wherein said openings defined in the free ends of said end walls are slots having open ends along the upper edges of said end walls and wherein each said hook means on said base includes a cam surface for guiding said lower horizontal element of a corresponding bread guard thereinto, the distance between said upper and lower horizontal elements being predeterminedly greater than the distance between said slots and hooks, whereby said bread guards are snap-fitted into engagement therewith.

10. A toaster chassis assembly as claimed in claim 8 wherein said assembly includes first, second and third heating element cards, spaced from each other in parallel relation to define two bread slice-receiving slots and first, second, third and fourth wire bread guards mounted adjacent said heating element cards, said second heating element card being positioned between said first and third cards for heating bread slices in both said first and second bread receiving slots and said second and third wire bread guards being positioned adjacent opposite surfaces of said second heating element card, respectively, to prevent bread slices received in said slots from engaging the opposite surfaces of said heating element card, the upper horizontal elements of said second and third bread guards being interweaved to form spaces therebetween for receiving said tabs formed along the upper edge of said second heating element card, thereby providing support to the upper end of said card.

* * * * *